DISHWASHING APPARATUS WITH AUTOMATIC DETERGENT-DISPENSING MEANS

Original Filed Sept. 15, 1952 4 Sheets-Sheet 1

Inventors
John C. Sharp
Leonard J. Martinick
By Andrew S. Hubbard
Atty.

DISHWASHING APPARATUS WITH AUTOMATIC DETERGENT-DISPENSING MEANS
Original Filed Sept. 15, 1952 4 Sheets-Sheet 2
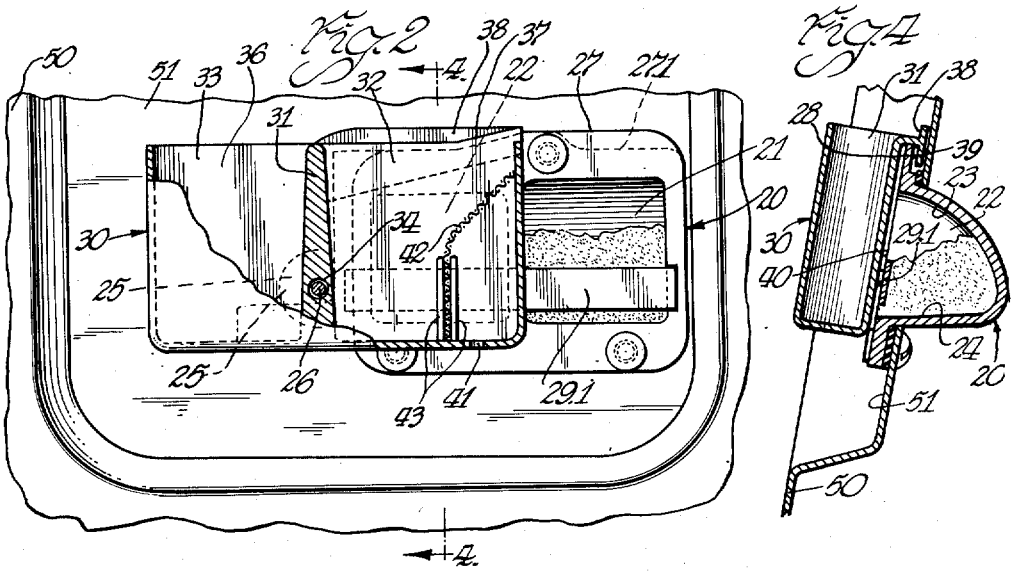
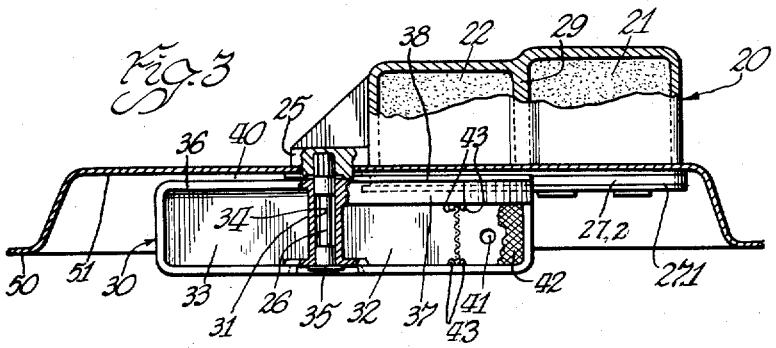
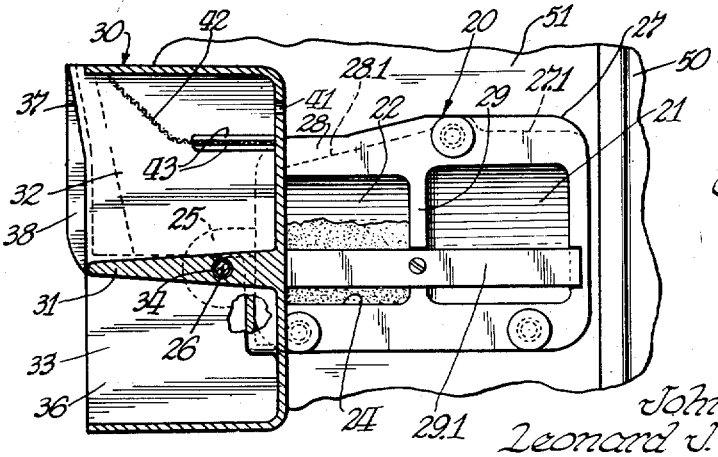
Fig. 5
Inventors
John C. Sharp
Leonard J. Martinick
By Andrew B. Hubbard
Attys.

DISHWASHING APPARATUS WITH AUTOMATIC DETERGENT-DISPENSING MEANS

Original Filed Sept. 15, 1952 4 Sheets-Sheet 3

Inventors
John C. Sharp
Leonard J. Martinick
by Andrew J. Hubbard
Atty.

DISHWASHING APPARATUS WITH AUTOMATIC DETERGENT-DISPENSING MEANS

Original Filed Sept. 15, 1952 4 Sheets-Sheet 4

Inventors
John C. Sharp
Leonard J. Martiniak
by Andrew F. Anderson Atty.

United States Patent Office

Re. 24,198

Reissued Aug. 21, 1956

24,198

DISHWASHING APPARATUS WITH AUTOMATIC DETERGENT-DISPENSING MEANS

John C. Sharp, Glen Ellyn, and Leonard J. Martiniak, Chicago, Ill., assignors to General Electric Company, a corporation of New York Original No. 2,711,178, dated June 21, 1955, Serial No. 309,588, September 15, 1952. Application for reissue May 17, 1956, Serial No. 585,597

18 Claims. (Cl. 134—56)

Matter enclosed in heavy brackets [ ] appears in the original patent but forms no part of this reissue specification; matter printed in italics indicates the additions made by reissue.

This invention relates to dishwashing apparatus, and in particular to a means for automatically introducing charges of detergent or other washing-liquid conditioners at spaced intervals during the operation of the apparatus.

Dishwashers of the time-cycle type, which perform automatically and in predetermined sequence the various steps of washing, rinsing, and drying dishes and other utensils contained therein, are now well known. In these dishwashers, drying is accomplished by the circulation of air over and about the articles while they remain in the machine, and the operator therefore merely loads the soiled articles into the machine, initiates the automatic operation and at any convenient later time removes the washed, dried dishes and other articles. The convenience of dishwashers, plus the fact that the washing operation is carried out at temperatures above that which human hands could endure and the hygienic advantage of air-drying as contrasted with towel-drying, has made the automatic dishwasher one of the most wanted of domestic electric appliances. However, despite the really high level of efficiency reached by modern dishwashers, there are conditions of operation in which spots will accumulate on glassware and the like; in fact, under severe local conditions the spots may increase in density as well as number over a succession of dishwashing runs. Accordingly, some users follow the practice of periodically handwashing and towel-drying glassware to restore the "sparkle" of a truly clean glass.

This spot accumulation is often due to local water conditions or to improper detergent or the use thereof. Investigation and the study of many case histories supports the conclusion that good results are obtainable even in hard water areas by improving on the actual washing operation. This does not mean merely to prolong the washing action, or to use more detergent in the washing solution, for the contamination of the first washing solution by the gross soil apparently prevents the proper runoff of liquid from the articles and therefore leaves them in a condition where redeposition of soil and water-borne solids produces the unwanted accumulations mentioned above.

The presently most effective method of combating the spot problem is to include more than one washing operation in the complete dishwashing cycle, separating the washing operations by an interval during which the spent liquid of the first wash is drained away. The rinsing operation after the final wash then more effectively removes the residual traces of soil. The aspect of this multiple wash practice with which this invention is concerned is the mechanism for introducing proper charges of detergent or other water conditioner at the appropriate time.

A principal object of our invention, therefore, is to provide a mechanism for automatically introducing charges of a water conditioning agent, such as a detergent, into the washing liquid at widely separated time intervals, and to protect the later-used detergent against loss or wetting during any washing and rinsing operations which precede the use of said later-used detergent.

Another object of the invention is to provide a detergent dispenser for a washing machine which will introduce a first and a second charge of detergent automatically and without recourse to a motor-driven mechanism, latches, or other mechanical devices for operating the dispenser.

It is a further object of the invention to provide a detergent dispenser which operates by water action alone, and will therefore function uniformly and automatically even when installed in manually controlled, as distinguished from automatic time-cycle controlled, apparatus.

Yet another object of the invention is to provide a dispenser which operates by gravity to expose a second charge of conditioning agent to the washing liquid.

It is an object of the invention to provide a dispenser which operates to introduce a quantity of conditioning agent to the washing liquid at the proper time after the use of a first charge of detergent.

It is an object of the invention to provide a dispenser for automatically supplying charges of washing-liquid conditioning agents at timed intervals during the operation of a washing machine, said dispenser having means for preventing the loss or contamination of the conditioning agents by premature operation.

A feature of our invention is the complete absence of latches, detents, or like devices for timing the operation of the dispenser. In a presently preferred form, in which the dispenser is used to introduce charges of detergent during each of two spaced washing periods, we provide a container having two side-by-side cups for the reception of suitable charges of detergent. The container is adapted to be placed on the inner panel of a washing machine door or on a side wall structure forming a side wall portion of the tub or vat within which the washing action takes place. For example, in one well-known dishwashing machine, the door to the washing tub is hinged at its bottom to be moved between a substantially vertically operating position and a substantially horizontal loading or charging position; and we arrange the detergent container cups on an inner panel of said door so that the cup openings will face upwardly when the carrier panel is horizontal, thus permitting loading of the cups, and face inwardly to expose the detergent to water action within the dishwasher tub when the carrier panel is in its operative vertical position. By a novel arrangement of guard flanges and the inner wall of the detergent cups, water action during the rinse cycles is kept from the detergent, whereas during the washing cycle the detergent is released into the washing liquid.

To protect the detergent in one cup for use at the later time, we apply a novel gate or pivoted cover comprising an elongated structure formed with two side-by-side cups which will accumulate water at the commencement of the washing operation. The pivot about which the gate is freely rotatable is placed so that the gate structure is gravity-biased for rotation in a direction in which one of its cups completely covers the reserved detergent cup. This last-named gate cup has a small drainage opening at its bottom.

During the first washing action, the gate cups remain filled, because water enters the cups faster than it drains through the opening. The reserve detergent cup will remain covered during the first wash cycle, and only the detergent in the exposed cup will enter the washing solution.

After the first washing and rinsing operation the machine is permitted a quiescent period in which there is no inflow or distribution of water within the machine. During this period water will drain from the gate cup which has been covering the second detergent cup. After an interval the weight of water remaining in the other gate cup overbalances the gate, causing the gate to rotate to a second stable position in which the remaining detergent cup is exposed. When the machine again goes into its washing operation, either by automatic or manual control, the detergent will be washed into solution by the ensuing water action.

Other features and advantages will best be understood by the following detailed description of a presently preferred embodiment of our invention, read in the light of the accompanying drawings, in which:

Fig. 2 is a front elevation of the detergent system mounted on the inner front door panel of the dishwasher. Fig. 2 shows the apparatus at the start of the operation, and certain portions of the control gate have been broken away to reveal underlying structure;

Fig. 3 is a top plan view of the detergent control system, portions thereof being in section;

Fig. 4 is a side sectional elevation of the system taken on lines 4—4 of Fig. 2;

Fig. 5 is a front elevation of the detergent dispenser, showing the control gate portion in vertical section and in its position in which the reserve detergent cup is exposed;

Fig. 7 is a view similar to Fig. 2, showing the apparatus arranged for dispensing a liquid detergent, wetting agent, or the like;

Figure 8:
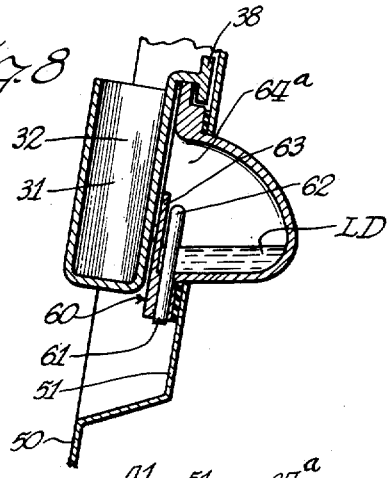
Figure 9:
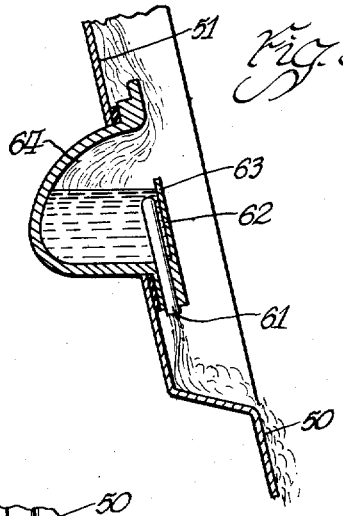
Figure 10:
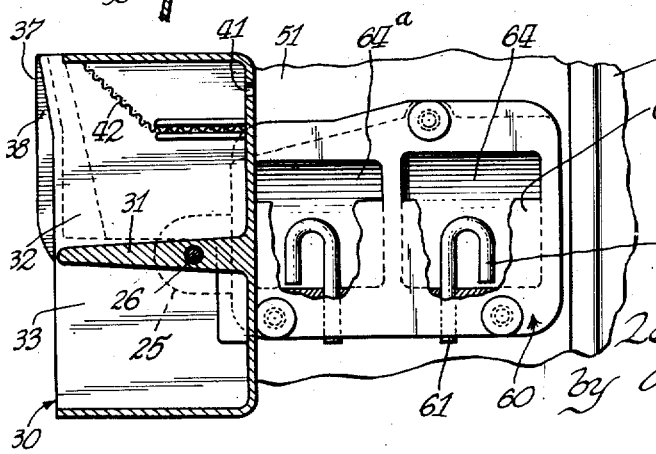
Figure 11:
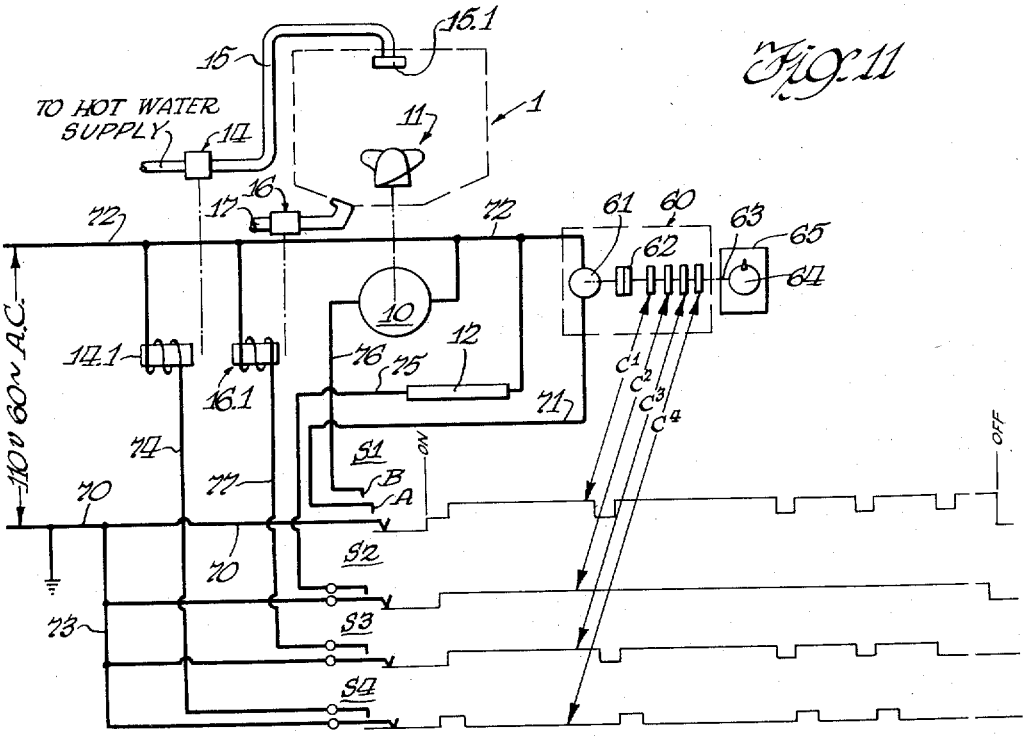
Figure 12:
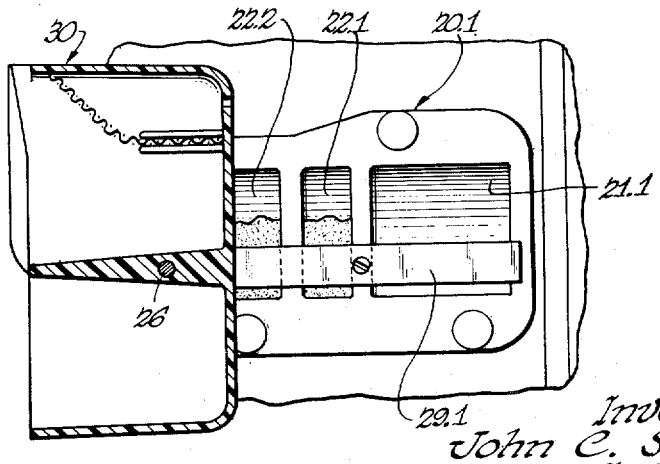

Figs. 8 and 9 somewhat schematically show operational details of the dispenser of Fig. 7 prior to and during the discharge of the liquid conditioning agent;

Fig. 10 is a front elevation of the apparatus, partly in section, at the conclusion of the operation of the dishwashing machine;

Fig. 11 is a schematic wiring diagram for automatic operation of dishwashing apparatus embodying our invention; and Fig. 12 shows a second form of detergent dispenser, having three cups for detergent or other water-conditioning agents.

Figure 1:
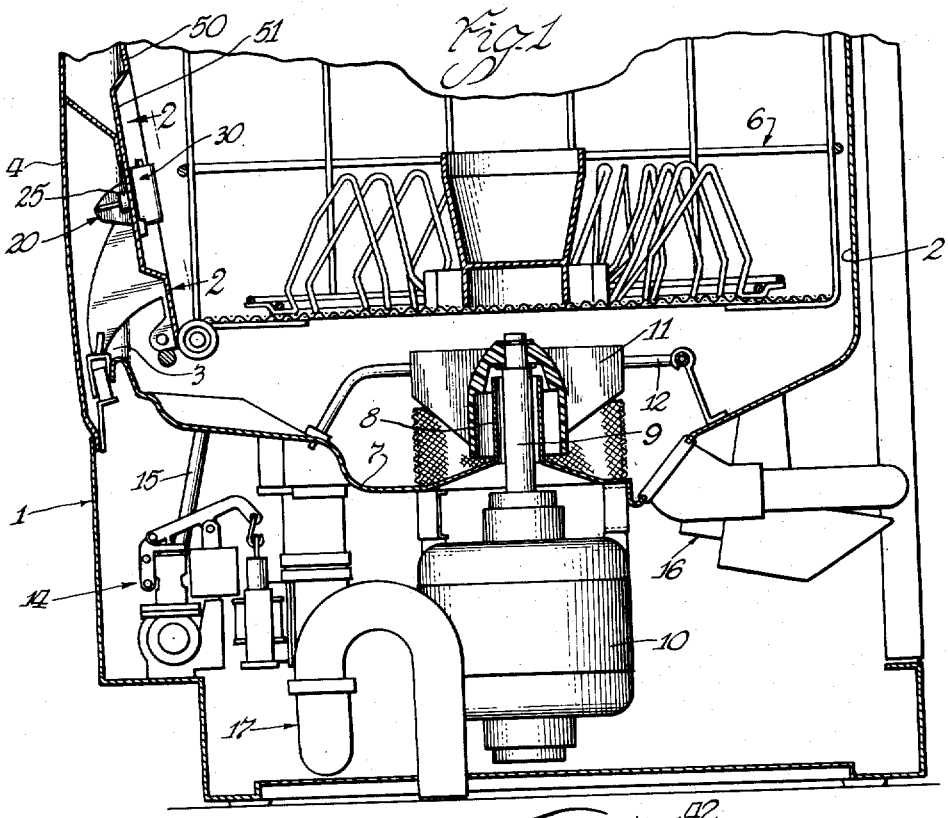
Fig. 1 is a fragmentary side sectional elevation of the lower portion of a typical dishwasher to which our invention has been applied.

Fig. 1 shows enough of a dishwasher for an understanding of the objectives and function of our invention. The dishwasher is generally of the type shown in U. S. Patent No. 2,655,165, issued October 13, 1953, to Frank D. Low for "Water Impervious Closure for Washing Apparatus," and assigned by mesne assignments to our present assignee. Such a dishwasher comprises an outer casing or frame 1 within which is rigidly supported a tub or washing vat 2 having a base, side and end walls and a top wall (not shown). The front wall portion of the tub has a peripheral flange 3 which defines a front opening arranged to be closed by a door 4 pivoted at its bottom to permit being manually swung between its substantially vertical operating position and a substantially horizontal open or loading position. The door may be constructed and arranged according to the disclosure of the Frank D. Low Patent 2,573,798, which issued November 6, 1951, for "Interlocking Door Hinge."

A dish-supporting rack structure 6 is mounted in guide rails (not shown) projecting from the side walls of the tub, and when the door 4 is in its horizontal loading position the rack structure may be drawn outwardly on to the door, loaded with the dishes and other articles, and returned to the tub, following which the door may be closed in preparation for the dishwashing operation.

The bottom of tub 2 is formed with a sump 7, in the central area of which is a conical formation terminating in the upstanding tubular wall 8. This wall extends above the level of water accumulation in said sump and acts as a guard preventing water from escaping along the impeller shaft 9 and reaching the motor 10 bracketed to the bottom wall of the tub. Fixed to said shaft 9 for rotation thereby is an impeller 11 such as disclosed in the Koertge U. S. Patent 2,422,022, dated June 10, 1947. This impeller forcefully circulates water throughout the tub to accomplish the cleansing of the articles therein, and also effects the circulation of air within the tub during the later drying stage. The air is brought into the tub through the annular space about the shaft 9, as will be apparent. Also supported within the tub so as to encompass the impeller is a heating element 12 of the conventional sheathed resistance conductor type. This heater is arranged to be energized during almost the entire operation of the machine; during the water-using stages thereof, the heating element maintains the water temperature, and it assists in the final drying operation by raising the temperature of the incoming air.

Within the cabinet 1 and below the tub are an electromagnetically controlled water inlet valve organization 14 which connects to the building water supply system (not shown) and controls flow through a tube 15 leading to a spray-type inlet fitting 15.1 (Fig. 11) at the top of the tub, and an electro-magnetically operated drain valve system 16 which communicates with a conventional trap seal fitting 17 discharging into the building plumbing waste system (not shown).

We wish it clearly understood that our invention is not limited to machines of the automatically controlled type; it is equally useful with those in which all of the water inlet, wash and drain operations are manually controlled. However, for illustrative purposes we enumerate a typical sequence of operations of a multiple-wash automatic dishwasher as follows:

Turn on time-control switch 60, Fig. 11. This begins the timer operation which functions to:

(1) Open inlet valve system 14 (the drain valve is normally open), admitting water into the tub through the top-wall spray head 15.1, Fig. 11, spray-rinsing the articles for about 45 seconds to remove loose soil which passes down the drain. Close heating element circuit.

(2) After 45 seconds, but without interruption of water inflow, close drain valve, close motor circuit to operate impeller. Continue to admit water for a predetermined period.

(3) Shut off inlet valve; maintain drain valve closed; maintain power on motor for approximately five-minute wash period. The first detergent charge will go into solution at this time.

(4) Shut off motor; open drain valve for complete drainage of first wash water.

(5) Idle interval.

(6) Restart motor; close drain valve; admit water for predetermined water inlet period.

(7) Close inlet valve and wash for second five-minute period. The second detergent introduction is made during this time.

(8) Open drain valve; stop motor for complete drainage.

(9). Close drain valve; start motor; admit water for two-minute rinse.

(10) Stop motor; open drain valve.

(11) Repeat 9 and 10 for a second two-minute rinse.

(12) Stop motor and open drain for final drainage.

(13) With drain valve open and water inlet valve closed, operate motor to circulate warm drying air within the tub.

(14) Ten minutes before end of cycle open heating element circuit.

(15) Everything off.

As used with such a two-wash cycle, our invention relates to the means for effecting the timed introduction of the detergent. Referring first to Figs. 2 and 3, the detergent dispenser includes a multiple compartment container 20 and a gravity-operated guard or gate 30 pivotally associated therewith. The container 20 is subdivided into individual detergent cups 21 and 22. These cups are of similar cross-sectional shape; the rear wall 23, for example, curves rearwardly and downwardly and then curves forwardly to meet the downwardly sloping bottom wall 24, as best shown in Fig. 4. As later explained, the content of the detergent cups is efficiently evacuated through the open front thereof. The detergent capacity of cup 22 may be less than that of cup 21, because the first wash in which the detergent in cup 21 has been consumed will have removed a large amount of the soil.

Figure 6:
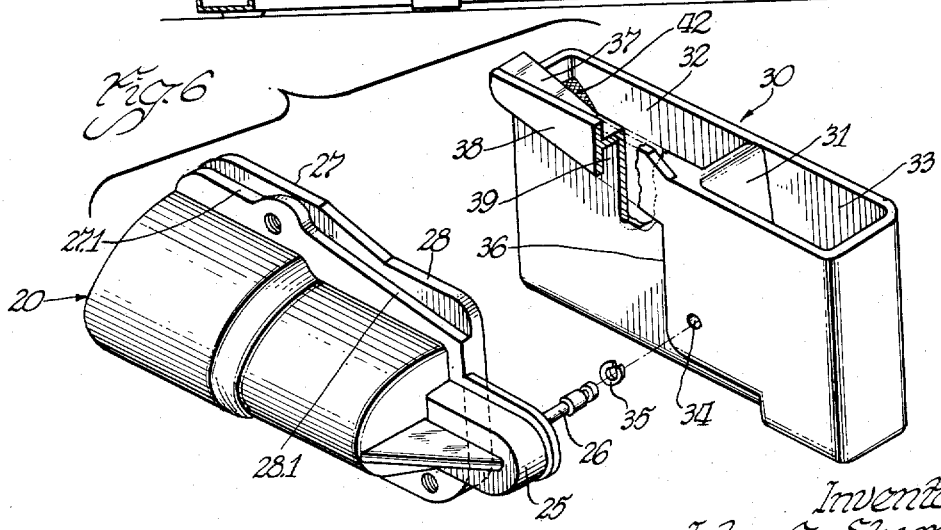
Fig. 6 is an exploded perspective of the detergent-dispensing system, looking from the rear thereof.
Figure 1:
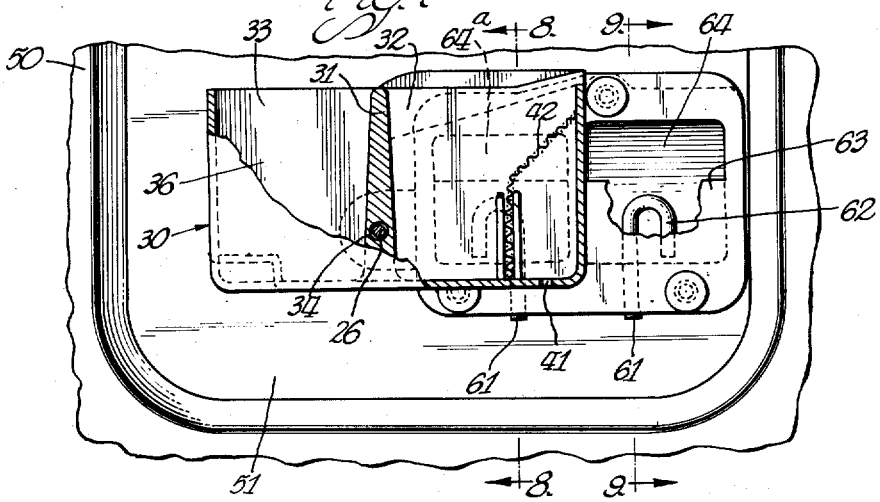

The container 20 is flanged for convenient attachment to a wall of the dishwasher as later described. An extension 25 receives a pivot pin 26 on which the gate 30 is mounted for free rotation. The topmost flange of the container, as viewed in Fig. 6, is formed to provide front flange portions 27 and 28 and the respective rear flange portions 27.1 and 28.1. Drainage channels are thus provided between the wall of the dishwasher door and the respective front flange portions, as indicated at 27.2 in Fig. 3. These channels contribute importantly to the operation of the dispenser, as later explained. The dividing wall 29 of the container is notched to receive and support a transverse guard strip 29.1 which is spaced about one-quarter inch from the bottom of the cups.

Gate 30 is an elongated structure having a transverse wall 31 dividing the gate into two water-receiving cups 32 and 33. Wall 31 is toward the left end of the structure as viewed in Fig. 2, and is formed with the passage 34 through which the pivot pin passes. The gate may be secured on the pin by a snapring or equivalent 35. The compartment 33 is greater in front-to-rear dimension than compartment 32, thus providing a rearwardly offset wall portion 36 which cooperates with the adjacent end wall flange of container 20 to establish a normal operative position of the gate relative to the detergent container. The left-hand end of the gate, as viewed in Fig. 6, is the heavier. This end portion of the gate is further characterized by a downwardly sloping wall 37, along the outer edge of which is a vertical wall portion 38 providing a channel 39 within which fits the front flange portion 28 of the container. As best appears in Figs. 2 and 4, the inter-relationship of the respective walls 37, 38 and 27 prevents water falling from above the container from entering cup 22, thus making it unnecessary for the rear wall of gate cup 32 closely to overlie the front wall of cup 22 to prevent water from dripping or splashing into the charge of detergent in said cup 22. Such water will pass along the surface of flange 28.1 and through the space 40 between the gate cup 33 and the wall of the dishwasher vat.

As shown in Figs. 2 and 3, gate cup 32 has a drainage opening 41. Said opening is advantageously placed in the bottom wall of the cup, but obviously may be through the front wall near the base thereof. The opening should substantially completely drain the cup 32 within a predetermined maximum time—for example, 10 seconds after the water action within the dishwasher tub ceases. Suitable guard means, such as a screen 42 or cap member (not shown), may be employed within the cup 32 to protect the opening 41 against clogging with waterborne food particles during the washing operation. The screen may be removably supported within cup 32 by any suitable means, such as the pairs of ribs 43, 43 projecting from the front and rear walls of the cup.

The detergent dispenser is mounted on a tub wall with the open fronts of the detergent cups facing the interior of the tub. A logical location for the dispenser is on the door 4, which is arranged to be moved between its illustrated substantially vertical operating position and a substantially horizontal loading position. It is a simple matter for the user to place an appropriate quantity of detergent into the then upwardly facing detergent cups 21 and 22, rotate the gate 30 into its guard position, and close the dishwasher door.

We form a shallow depression in the inner panel 50 of the dishwasher door and provide in a rear wall 51 of said depression an opening to receive the rearwardly projecting body portion of the dispenser element 20. Screws or other suitable fastenings reaching through the wall 51 into the peripheral flange of the dispenser serve to secure the same tightly against the face of the wall with only the thickness of the container flange and any appropriate gasket (not shown) between the flange and wall projecting into the tub. The detergent container is mounted suitably above the surface of any water pool which may accumulate in said tub during washing action or any surge action or wave formation of such water accumulation. In other words, when we speak of water action as the medium by which the detergent is removed from the detergent container, we mean the action of water cascading down the inner door panel, plus the activity of the water drops and sprays as they permeate the volume of the tub during the washing action.

As appears in Figs. 1 and 4, the slope of the wall portion 51 when the door is in closed position gives to the bottom wall of the respective detergent cups a gentle down slope sufficient to insure complete evacuation of the detergent. The guard 29.1 prevents spillage of the dry detergent into the tub as the door is closed, but does not interfere with the discharge of detergent.

During the initial rinse period, when water is coming into the tub through the overhead spray and the impeller is quiet, some water will flow downwardly along the door panels 50 and 51. The amount of such water flow is small, and the gutter or channel 27.2 diverts this water flow away from the detergent cup 21. The sloping wall 37 of the gate structure performs a similar service as to cup 22. It is probable that during this preliminary spray period, the respective gate cups 32 and 33 will begin to fill. Experience indicates that they fill at substantially the same rate and therefore the balance of the gate is undisturbed.

Water inflow continues, the drain valve closes, and the impeller begins its rotation. The quantity of water measured into at least one commercially successful automatic dishwashing machine to carry out the washing operation is of the order of 12 pints. Following the admission of this amount of liquid, the inlet valve closes, either by reason of an elapsed time period on the time-cycle control, or in some types of machines, resulting from the operation of a current demand relay sensitive to the motor load as it increases with the increasing volume of water handled by the impeller. In any event, as the water accumulates in the sump the impeller violently throws the water over and about the contents of the tub, and during this intensive water action, water cascades down the door panel 50 and into the depression 51. The water flow is above the diversion capacity of channel 27.2, and it overflows the front of the detergent cup, following the rearwardly and downwardly sloping rear wall 23 of the cup. The water "undermines" the charge of detergent and insures that the detergent will be completely evacuated. In addition, the multitudes of water particles entering from the front assist in the removal of the detergent, which becomes dissolved in the wash-water to provide the desired washing solution.

During the entire washing operation, the gate cups 32 and 33 are kept filled by the water action, even though as respects cup 32, water is continuously escaping through the drain port 41. The inherent overbalance of the gate in the direction tending to keep detergent cup 22 covered, is augmented by the relatively larger volume of water which cup 32 contains, and the gate maintains its closed position in spite of the violent water action. The sloping wall 37 and the inter-fitting relationship of the walls 28 and 38 very effectively prevent water from entering the cup 22 from above, and the complete coverage by gate cup 32 of the open front of the detergent cup 22 prevents water from being splashed in along the bottom or side margins of said detergent cup.

At the end of the first washing period the gross soil has been removed from the soiled articles. The impeller stops and the drain valve opens. Cup 32 will empty in about ten seconds. The weight of water in cup 33 overbalances the gate, which rotates into its Fig. 5 position to expose the detergent in cup 22. The gate is substantially at right angles to the bottom wall 24 of the detergent cups, as established by the meeting wall formations shown clearly in Fig. 5. The center of gravity is sufficiently to the left of pivot 26, as viewed in Fig. 5, to eliminate the possibility of water action moving the gate accidentally to closed position during the next wash operation.

It is probable that during the washing action some small food particles may have been thrown into both gate cups. Cup 33 is completely self-cleansing as it tips, and any residue left within cup 32 or on the screen 42 thereof will be removed by water flowing along the inside walls of the cup during the period of violent water action. Screen 42 is readily removable for thorough brush cleansing at suitable intervals.

As the second wash operation begins, the water action removes the detergent from cup 22 in the manner previously described. The resulting detergent solution is particularly effective to remove the residual soil from the articles in the racks and from the walls of the dishwasher tub; and the final stages of clear water spray rinsing leave the articles in optimum condition for the final air-drying.

It is to be understood that the dispenser may be used to supply water-conditioning agents such as water softeners or wetting agents in addition to or in lieu of detergents. For example, it may be advantageous to supply a water softener to the first wash liquid or to supply a wetting agent in lieu of or in addition to the detergent added to the second wash liquid. Without departing from the spirit of our invention, we may add additional dispenser cups to the container. For example, an additional cup similar to cup 21, may be added adjacent said cup; cup 21 may then contain soap powder or the like and the additional cup (not shown) may contain a water softener such as trisodium phosphate. In such an arrangement, the soap powder and water softener would be dispensed at the start of the first wash, just as described for the detergent in cup 21. Fig. 12 shows a detergent or water conditioner dispenser 20.1, providing a first-wash dispenser cup 21.1 and two second-wash cups 22.1 and 22.2. In this arrangement the two second-wash cups might contain, respectively, a suitable detergent and a wetting agent such as sodium lauryl sulphate which would reduce the surface tension of the liquid and cause it to drain more freely and completely from the articles in the tub at the completion of the second washing operation. In Fig. 12, the gate structure 30 (shown in elevational section) is in all respects similar to the gate construction previously described.

The embodiment of Figs. 7 through 10 is particularly adapted for dispensing liquid detergent or conditioners. In all respects, the gate 30 may be identical with the first-described embodiment and repetition as to its construction or operation should be unnecessary. The container 60 for the conditioner has much in common with the previously described container 20. For example, it has two cups 64, 64a, and is flanged for mounting on the inner door panel 50. The upper flange is configurated to provide the drainage channel effective to divert the relatively small quantities of water during the rinsing operation, but incapable of handling the cascading water during the washing cycles. The rear wall contour of each cup is advantageously similar to the rear wall 23 of the container 20.

A siphon is located in the forward portion of each cup; the long leg 61 of the siphon discharges against the bottom wall of the depression 51 formed in the door panel 50 as best appears in Fig. 9. The short leg 62 of the siphon reaches nearly to the bottom wall of the cup in which it is located. A front wall 63 closes off each cup up to a point above the maximum height of the siphon, leaving a forwardly facing opening through which water may enter during the washing operation.

The charges of water-conditioning agent may be placed in the dispenser cups when the dishwasher door is in its open position. When the door is closed the liquid detergent or other material will occupy the bottom portion of each cup as indicated at LD in Fig. 8. The entrance of the siphon tube is submerged in the liquid, but because of the air within the tube, there will of course be no siphonic action.

During the rinsing operations very little water will enter the dispenser cups because of the diversion by the upper flange channels. During the washing cycle, however, the quantities of liquid flowing down the front panel will fill and overflow the channel and pour into detergent cup 64 as indicated in Fig. 9. The siphon will quickly be submerged and the charge of conditioning agent emptied into the vat. It will be understood of course that the cup 64a will be protected against inflow of water by the gate 30 until following the completion of the first washing cycle the gate cup 32 empties to permit operation to the second wash position shown in Fig. 10.

The lightness, simplicity, and freedom from mechanical devices permits manufacture of our dispensing apparatus mainly from inexpensive plastic materials. There are no critical tolerances, either dimensionally or as respects the weight distribution of the empty gate structure. It is only necessary to provide an unbalanced condition which will hold the gate closed when its cups are in an empty or partially filled state and release the gate for rotation to open position when the water has substantially completely drained from cup 32.

The control apparatus for effecting the previously described time-cycle operation may be adapted from well known control devices. For example, as shown in Fig. 11, the control apparatus may be of the type shown in the D. F. Illian, U. S. Patent 2,619,557, granted November 25, 1952, for "Program Selector Switch" and assigned to our assignee herein.

Specifically, the control apparatus may include the time-cycle control 60, having a conventional timer motor 61, driving through a friction clutch 62, a shaft 63, on the end of which is a control knob 64. It is understood that the control knob will be suitably mounted externally of the dishwasher housing for manual manipulation by the user, and that a pointer or the like on the knob will have reference indicia such as "off" and "on," market on an escutcheon plate 65, mounted on an external wall of the cabinet 1 behind the knob.

Shaft 63 has mounted thereon for rotation therewith, a set of four cams C1, C2, C3, and C4, all of insulation material. It will be assumed that the motor 61 (operating through suitable reduction gearing, not shown) will drive the set of cams at a rate of one revolution per hour.

The respective cams effect the opening and closing of spring-leaf contact switches as follows:

Cam C1 operates switch S1, having contacts A and B which are closed in that order and are opened in reverse order; said contacts A control the circuit to the timer motor 61 and contacts B control the circuit to the impeller motor 10, as clearly appears.

Cam C2 controls the operation of the single pole, single throw switch S2, the contacts of which control the energy to the heating element 12.

Cam C3 controls the energy to the outlet valve solenoid 16.1, and it will be understood that the outlet valve is closed only when the solenoid 16.1 is energized. In other words, it is what is known as a "normally open" valve system.

Cam C4 controls the energy to the inlet valve solenoid 14.1; said valve is normally closed and is open only when its solenoid 14.1 is energized.

In the diagrammatic showing of the cams and associated switches in Fig. 11, it will be assumed that motor 61 drives the shaft 63 in clockwise direction, and that this has the effect of causing the schematic representation of the cams to move to the left of the figure. When the user rotates knob 64 clockwise to the "on" position, an intermediate step on cam C1 closes contacts A of switch S1, and energizes the timer motor through a circuit comprising line conductor 70, contacts A, conductor 71, timer motor 61, and thence to line conductor 72. The contacts B of said switch S1 are not closed at this stage of operation and the motor and impeller are quiet. From that point on the timer motor drives the cam shaft 63 in the clockwise direction. Shortly thereafter, cam C4 causes switch S4 to close its contacts, energizing the inlet solenoid 14.1 through a circuit comprising conductors 70, 73, switch S4, conductor 74 to solenoid 14.1, and thence to line conductor 72. The motor 10 remains quiet, and because switch S3 is still open, the drain valve is open. The water spraying into the tub from the overhead spray fitting 15.1 rinses the loose soil from the dishes in the tub and it passes to the open drain. At that time, or any appropriate later time, as desired, cam C2 can be caused to close switch S2 to energize the heater 12 through a circuit comprising line conductor 70, conductor 73, switch S2, conductor 75 to heater 12, and thence to line conductor 72. After about 45 seconds a high step of cam C1 closes contacts B of switch S1, while of course maintaining contacts A thereof closed; and the impeller motor is energized through the circuit comprising line conductor 70, contacts A and B of switch S1, conductor 76 to motor 10 and thence to line conductor 72. Coincidentally therewith, cam C3 causes the contacts of switch S3 to close energizing the drain valve solenoid 16.1 through the circuit comprising line conductor 70, conductor 73, switch S3, conductor 77 to solenoid 16.1 and thence to line conductor 72. The drain valve 16 closes upon energization of its solenoid 16.1 and, as indicated, switch S4 remains closed for the further interval necessary to introduce about twelve pints of water into the tub. Under normal water line pressure, this is accomplished in about 45 seconds. Cam C4 then causes switch S4 to open, de-energizing solenoid 14.1 and stopping further inflow. The drain valve remains closed and the motor 10 energized for the first wash period of about two minutes, during which the first detergent charge is evacuated from its cup 21.

At the end of this washing time an intermediate step of cam C1 causes contacts B of switch S1 to open (contacts A thereof remaining closed) and cam C3 causes switch S3 to open, thus de-energizing motor 10 and the drain valve solenoid 16.1. The drain valve returns to open position to permit the soil-bearing wash liquid to drain from the tub. During the resultant quiescent period within the tub, liquid drains from cup 32 and the liquid remaining in cup 33 overbalances the gate exposing the detergent in the second detergent cup 22. The end of this drainage period is signified by the reclosing of contact B of switch S1, the reclosing of the contacts of switch S3 to re-energize the drain valve solenoid 16.1 to close the drain valve, and the reclosing of switch S4 to re-energize the inlet valve solenoid 14.1 for a further period calculated to introduce a second twelve pint volume of water into the tub through the fitting 15.1. A second wash period of approximately two minutes is then under way and the second charge of detergent enters the washing liquid, as previously described.

The end of this second wash period is signified by the opening of the motor 10 circuit and the drain valve solenoid circuit as previously described; and following the drainage of the second wash liquid from the tub, the cams operate their respective switches to restart the motor 10, close the drain valve, and admit wash water for a two-minute rinse period. Following drainage of the rinse water, during which time the motor 10 is again stopped, the cams operate the switch to re-energize the motor, reclose the drain valve, and admit water for a second rinse period. At the end of this rinse period, the motor 10 is stopped briefly as the drain valve solenoid is de-energized to permit final drainage. Neither the drain valve solenoid nor the inlet valve solenoid is again energized during the remainder of the cycle; the motor 10 is re-energized for the remainder of the cycle to cause air circulation within the tub. At about ten minutes before the end of the drying cycle, cam C2 causes switch S2 to open the circuit to the heater 12. At the completion of the cycle, at which time the pointer on the knob 64 will have returned to the "off" position, cam C1 will cause contacts A and B to open, thus interrupting the circuit to the timer motor 61.

Because of the fact that the operation of the dispenser is dependent on a particular condition of water action within the dishwasher and not upon mechanical timing devices, the dispenser is as useful with manually controlled dishwashers as with automatic apparatus. The first washing action will always utilize the first water-conditioning charge, and so long as the operator of a manually controlled machine waits at least ten seconds before beginning the second washing operation, the gate will move to its open position in preparation for said second operation.

While there has been described what are at present considered to be the preferred embodiment of the invention, it will be understood that various modifications may be made therein, and it is intended to cover in the appended claims all such modifications as fall within the true spirit and scope of the invention.

We claim:

1. In a washing machine having a tub to contain the articles to be washed, water inlet means for said tub, means for forcefully circulating water throughout said tub for washing the articles therein, means for controlling drainage from said tub, and means for intermittently operating said means for establishing a sequence of filling, washing, and drainage periods; the improvement comprising a detergent dispenser having a plurality of cups to receive charges of detergent, each of said cups having passage means through which the detergent charge thereof may be evacuated into said tub, means for mounting said detergent dispenser within said tub in a position exposing said cups to the entry of a volume of water to evacuate the detergent therefrom during a washing period; guard means covering one of said cups, means for maintaining said guard means in covering position during a first washing period to prevent water from entering said one cup in sufficient quantities to remove any appreciable amount of detergent therefrom; and means effective during a quiescent period of said machine following said first washing period to operate said guard means to expose said one detergent cup for evacuation of its detergent charge into said machine during a succeeding washing period.

2. A detergent dispenser for a washing machine having a tub, means for introducing liquid into said tub, means for circulating said liquid throughout said tub to wash the articles contained therein, means for controlling drainage of liquid from said tub, and means for intermittently operating said means to establish a series of filling, washing, and drainage periods; comprising a detergent container having a plurality of cups to receive individual charges of detergent, each said cup having an opening facing the interior of said tub through which liquid may enter during the circulation thereof incident to a washing operation to evacuate said detergent into said tub; means for mounting said container on a wall of said tub; a closure member movably supported in front of said container, means for biasing said closure member into position covering the opening of one of said cups to protect the detergent content thereof against any substantial amount of liquid inflow while leaving another cup open for entry of liquid to evacuate the detergent therefrom, said closure member having liquid accumulation means effective during a washing period to maintain the said bias of said member, and means for draining a portion of said accumulated liquid during a drainage period following a washing cycle to provide a weight disposition in said closure member effective to overcome said bias and move the closure member to a position exposing said one cup for evacuation of its detergent charge during a succeeding washing period.

3. In a washing machine having a tub to contain articles to be washed, means for introducing water into said tub, drain valve means for controlling drainage from said tub, motor-driven impeller means to circulate water forcefully throughout said tub and against the walls thereof during a washing operation and means for controlling the periods of operation of each of said means in a sequence of washing and drainage periods; the improvement comprising a detergent dispenser having a plurality of cups to receive individual charges of detergent, said cups having passage means through which the detergent charge may be evacuated into said tub and passage means diverting into said cups water flowing down a wall of said tub, means for mounting said detergent container on said wall, whereby water flow along said tub wall generated by impeller operation during a washing operation will enter said cups to create a detergent mixture flowable into said tub through said first-named passage means, a gate member covering one of said cups, means for maintaining said gate member in covering position during said washing action to prevent water from entering said one cup in sufficient quantities to remove detergent therefrom, and water-actuated means effective during a drainage period following said washing action to operate said gate to expose said detergent cup for evacuation of its detergent into said tub by water inflow to said cup during a succeeding washing operation.

4. In a washing machine having a tub to contain articles to be washed, a means for introducing water into said tub from above, means for controlling drainage from said tub, motor-driven impeller means within said tub for hurling liquid forcefully throughout said tub for accomplishing washing operations, and means for controlling the operation of said means to establish a sequence of filling, washing, and drainage periods; the improvement in detergent dispensing apparatus comprising a detergent container adapted to be mounted on a side wall of said tub well above the free level of water therein, said container having a plurality of cups for individual charges of detergent, said detergent cups having at their upper portions relatively large water inflow openings facing the interior of said tub and at their lower portions passage means for evacuation of a mixture of water and detergent into said tub responsive to water inflow into said cups during a washing operation, container flange means forming with the adjacent wall of said tub a drainage gutter for diverting water from said cups during periods when water is entering said tub from above, a gate member pivotally mounted forwardly of said container and biased into rotation in a direction in which an end portion of said gate member closes the water inflow opening of one only of said detergent cups to prevent water entry into said cup during an entire washing operation, said gate member having an upper flange interfitting within a container flange above said cups to prevent water seepage into said first-named cup from above during any water movement within said tub, means for accumulating water within said gate to maintain the bias thereof during said washing action, and means for draining a portion of said accumulated water from said gate following said washing action to cause residual water in said gate to overbalance the gate for rotation in a direction to expose said initially covered detergent cup for evacuation of its contents into said tub by water action during a succeeding washing operation.

5. A detergent dispenser for a washing machine having a tub, means for introducing water into said tub, means for circulating said water throughout said tub to wash articles contained therein, said circulation means causing substantial quantities of water to flow down the tub walls, means for draining said tub following a washing operation, and means for controlling the operation of the respective means to cause a sequence of filling, washing and drainage periods; comprising a detergent container having a plurality of cups to receive individual charges of liquid detergent, each said cup having a siphon through which a mixture of water and detergent may be evacuated into said tub and passage means above said siphon effective to direct into said cups water flowing down a wall of said tub, said cups having a water-retaining capacity sufficient to submerge said siphons, means for mounting said container on said wall, a closure member movably supported in front of said container, means for biasing said closure member into position covering at least the water inlet passage of one of said cups to protect said one cup and its detergent content against water inflow while leaving another cup open to receive water for the submergence of said siphon for evacuation of the detergent and water mixture by siphonic action, and a plurality of water-entrapping cups on said closure member to collect water during periods in which water is being circulated throughout said tub, said cups being effective when filled, to maintain said closure-member bias, and means effective during a quiescent period following a washing action to drain the water from one only of said cups, whereby the weight of said other liquid-entrapping cup and its contents overcomes the said initial bias to move said closure member to a new position exposing the initially covered detergent cup to subsequent water action.

6. In a washing machine having a tub to contain articles to be washed, said tub having a sump portion, means for introducing washing liquid into said tub, means for draining said sump, motor-driven impeller means effective during a washing operation to pick up washing liquid from said sump and hurl it forcefully throughout said tub, and means for controlling the operation of said impeller and said drainage means; the improvement in detergent dispensers comprising a detergent container adapted to be mounted on a side wall of said tub well above the level of liquid in said sump, said container having a plurality of cups for individual charges of detergent, said detergent cups having relatively large liquid inflow openings facing the interior of said tub and passage means for evacuation of a mixture of liquid and detergent into said tub responsive to liquid flow into said cups during washing operations, a gate member pivotally mounted relative to said container and biased into rotation in a direction in which a wall of said gate member completely overlies all but one of said detergent cups to permit liquid entry only into said one cup during a first washing operation, and means responsive to a quiescent impeller period following said washing action to cause said gate to rotate in a direction to expose another detergent cup for evacuation of its contents into said tub by liquid inflow during a succeeding washing operation.

7. In a washing machine having a tub to contain articles to be washed, means for introducing water into said tub from above, means for draining said tub, motor-driven impeller means for picking up water from the bottom of said tub and hurling it forcefully throughout said tub during a washing operation, and means for controlling the operation of said impeller and said drainage means to establish desired periods of washing and drainage; the improvement in means for adding conditioning agents to said water, comprising a container adapted to be mounted within said tub well above the free level of liquid therein, said container having a plurality of cups for individual charges of water conditioner, said cups having relatively large water inflow openings facing the interior of said tub and passage means for evacuation of water conditioner into said tub responsive to water inflow into said cups during a washing operation, guard means across the lower portions of said cups to prevent untimely escape of conditioner into said tub, means for substantially eliminating water inflow into said cups during quiescent periods of said impeller, a gate member pivotally mounted relative to said container and biased into rotation in a direction in which a portion of said gate member completely overlies all but one of said cups to prevent water entry into other of said cups during an entire washing operation, means effective during said washing operation to maintain said gate bias, and means effective during the drainage of washing liquid following a washing operation to bias said gate for rotation in a direction to expose the other of said cups for evacuation of the contents thereof into said tub by water action during a succeeding washing operation.

8. For use in a dishwasher or the like having a tub to contain articles to be washed, means for introducing water into said tub, means for draining liquid therefrom, means for forcefully circulating water throughout the tub during washing operations, and means for controlling the periods of operation of said drainage means and water-circulation means; a detergent dispenser adapted to be mounted on a side wall of said tub so as to be in the path of water flow along said wall, comprising a container having a pair of detergent-receiving cups having large openings facing said tub whereby during washing operations water may enter said cups directly from said tub and by flow along said tub wall, said openings defined by downwardly sloping wall portions for emptying into said tub a mixture of water and detergent, flange means above said cups and forming a drainage gutter with the adjacent wall of said tub having a flow capacity capable of diverting away from said cups relatively small quantities of water which may be flowing down said wall during water-introduction stages or operational conditions other than washing operations, whereby a mixture of water and detergent will be formed in substantial quantity for flow through said cup opening into said tub substantially only as a result of the forceful water action accompanying washing operations; a gate structure pivotally mounted in front of said container and having a wall portion adapted to close the opening of one of said cups to preclude water flow thereinto even during said periods of enforced water circulation, said gate structure being gravity biased for rotation into said closing position, means on said gate forming a pair of upstanding water-receiving cups adapted to accumulate water during said enforced water circulation period, said cups being placed on opposite sides of the pivot axis of said gate structure and each being of such volumetric capacity that the conjoint filling of said cups will not disturb the said bias of said structure, and drainage means in one only of said cups effective during a relatively quiescent period following a washing operation to empty said cup, whereupon the weight of water in the other cup will overcome the bias to rotate said gate to a position exposing the water inflow opening of the second detergent cup for operation at a subsequent washing operation and accompanying enforced water circulation.

9. For use in a dishwasher or the like having a tub to contain articles to be washed, means for introducing water into said tub, means for draining liquid therefrom, means for forcefully circulating water throughout the tub during washing operations, and means for controlling the operation of said means to establish periods of filling, washing, and draining; a detergent dispenser adapted to be mounted on a side wall of said tub so as to be in the path of water flow along said wall, comprising a container having a pair of detergent-receiving cups having large water-inflow openings facing said tub at the upper portion of said cups, outflow openings emptying into said tub, flange means above said cups and forming a drainage gutter with the adjacent wall of said tub having a flow capacity capable of diverting away from said cups relatively small quantities of water which may be flowing down said wall during water-introduction stages or operational conditions other than washing operations, but flooding and spilling over into the water inflow openings of said cups during periods of forceful circulation of water within said tub typical of the washing operation whereby a mixture of water and detergent will be formed for flow into said tub through said cup outflow openings; and a gate structure pivotally mounted in front of said container and having a wall portion adapted to close at least the water inflow opening of one of said cups to preclude water flow thereinto even during said periods of enforced water circulation, said gate structure being gravity biased for rotation into said closing position, means on said gate forming a pair of upstanding water-receiving cups having relatively large upwardly facing inlet openings for admitting water into said cups during said enforced water circulation period, said cups being disposed on opposite sides of the pivot axis of said gate structure and being of such volumetric capacity that the conjoint filling of said cups will not disturb the said bias of said structure; the cup on the side of said pivot nearest the detergent cup to be covered by said gate structure having a small drainage opening effective during a relatively quiescent period following a washing operation to empty said cup, whereupon the weight of water in the other cup will overcome the bias to rotate said gate to a position exposing the water inflow opening of the second detergent cup for operation at a subsequent washing operation and accompanying enforced water circulation.

10. A detergent dispenser as in claim 9, in which the detergent cups have wall means below said inflow openings effective to prevent the loss into said tub of any substantial quantity of dry granular detergent present in said cups.

11. A detergent dispenser as in claim 9, in which the said detergent cups have rearwardly and downwardly curving rear wall portions effective to guide the inflowing water to the rear of said cups to undermine and evacuate into said tub a charge of dry, granular detergent contained by said cups.

12. A detergent dispenser as in claim 9, in which said detergent cups have relatively deep pockets below said inflow openings and the outflow openings from said cups to said tub comprise siphons opening into said cups near the bottom of said pockets and having a maximum height within said pockets below the fill level thereof.

*13. In a washing machine having a tub to contain the articles to be washed, water inlet means for said tub, means for forcefully circulating water throughout said tub for washing the articles therein, means for controlling drainage from said tub, and means for intermittently operating said means for establishing a sequence of filling, washing and drainage periods; the improvement comprising a detergent dispenser having a cup to receive a charge of detergent, said cup having passage means through which the detergent charge thereof may be evacuated into said tub, means for mounting said detergent dispenser within said tub in a position exposing said cup to the entry of a volume of water to evacuate the detergent therefrom into said tub during a washing period of said machine, guard means covering said cup, means for maintaining said guard means in covering position during a first washing period of said machine to prevent water from entering said cup in sufficient quantities to remove any appreciable amount of detergent therefrom, and means conditioned in response to the circulation of water within said tub during said first washing period and then operated during a quiescent period of said machine following said first washing period to actuate said guard means to expose said detergent cup for evacuation of its detergent charge into said tub during a succeeding washing period of said machine.*

*14. In washing apparatus including a vat adapted to receive the articles to be washed, and means operative in a cycle to produce two washing periods and an inter-*

*vening quiescent time interval, wherein water is forcefully circulated throughout said vat to wash the articles therein in each of said washing periods and water is drained from said vat in said quiescent time interval; a detergent dispenser comprising structure defining a chamber opening into said vat and adapted to receive a charge of detergent, a closure member cooperating with the opening into said chamber and movable into open and closed positions with respect thereto, whereby the detergent in said chamber is protected from the water action in said vat when said closure member occupies its closed position and is exposed to the water action in said vat when said closure member occupies its open position, said closure member being manually movable from its open position into its closed position following the placement of a charge of detergent in said chamber, mechanism conditioned in response to the water action in said vat in the first of said washing periods and then operated after conditioning thereof in response to the termination of the water action in said vat in said quiescent time interval, and means responsive to operation of said mechanism for moving said closure member from its closed position into its open position, whereby the detergent in said chamber is introduced into the water circulated in said vat in the second of said washing periods.*

*15. In washing apparatus including a vat adapted to receive the articles to be washed, and means operative in a cycle to produce two washing periods and an intervening quiescent time interval, wherein water is forcefully circulated throughout said vat to wash the articles therein in each of said washing periods and water is drained from said vat in said quiescent time interval; a detergent dispenser comprising structure defining a chamber opening into said vat and adapted to receive a charge of detergent, an element pivotally mounted on said vat for movements between set and trip positions, two cups carried by said element on opposite sides of the pivotal mounting therefor and opening into said vat and arranged to catch water therein when said element occupies its set position and to spill the caught water therefrom when said element occupies its trip position, a closure member cooperating with the opening into said chamber and moved into closed and open positions with respect thereto in response to movements of said element into its respective set and trip positions, whereby the detergent in said chamber is protected from the water action in said vat when said closure member occupies its closed position and is exposed to the water action in said vat when said closure member occupies its open position, said element being manually movable into its set position following the placement of a charge of detergent in said chamber, whereby water is caught in said two cups with said element in its set position during the first of said washing periods, and means defining a restricted leak passage communicating with one of said cups so that a sufficient quantity of the caught water leaks therefrom during said quiescent time interval to cause the weight of the caught water in the other of said cups to move said element into its trip position, whereby the detergent in said chamber is introduced into the water circulated in said vat in the second of said washing periods.*

*16. The washing apparatus detergent dispenser set forth in claim 15, wherein said closure member is carried by said pivotally mounted element and movable therewith into its closed and open positions as said element is moved into its respective set and trip positions.*

*17. The washing apparatus detergent dispenser set forth in claim 15, wherein said element and said two cups carried thereby are of one-piece molded plastic construction.*

*18. In dishwashing apparatus including an upstanding vat provided with a front opening and adapted to receive the dishes to be washed, a front door cooperating with said front opening and movable with respect thereto between a substantially horizontal open position and a substantially vertical closed position, and means operative in a cycle with said front door in its closed position to produce two washing periods and an intervening quiescent time interval, wherein water is forcefully circulated throughout said vat to wash the dishes therein in each of said washing periods and water is drained from said vat in said quiescent time interval; a detergent dispenser carried by the inner wall of said front door and comprising structure defining a chamber opening into said vat with said front door in its closed position and adapted to receive a charge of detergent, a closure member cooperating with the opening into said chamber and movable into open and closed positions with respect thereto, whereby with said front door in its closed position the detergent in said chamber is protected from the water action in said vat when siad closure member occupies its closed position and is exposed to the water action in said vat when said closure member occupies its open position, said closure member being manually movable from its open position into its closed position following the placement of a charge of detergent in said chamber with said front door in its open position, mechanism conditioned in response to the water action in said vat in the first of said washing periods and then operated after conditioning thereof in response to the termination of the water action in said vat in said quiescent time interval, and means responsive to operation of said mechanism for moving said closure member from its closed position into its open position, whereby the detergent in said chamber is introduced into the water circulated in said vat in the second of said washing periods.*

References Cited in the file of this patent or the original patent

UNITED STATES PATENTS

| | | |
|---|---|---|
| 2,174,729 | Schlock | Oct. 3, 1939 |
| 2,226,096 | Halsey | Dec. 24, 1940 |
| 2,276,801 | Stoddard | Mar. 17, 1942 |
| 2,498,517 | Wotring | Feb. 21, 1950 |
| 2,552,852 | Idle | May 15, 1951 |
| 2,620,811 | Walker | Dec. 9, 1952 |
| 2,655,165 | Low | Oct. 13, 1953 |